(12) United States Patent
Yagi et al.

(10) Patent No.: US 9,429,291 B2
(45) Date of Patent: Aug. 30, 2016

(54) OPTICAL UNIT

(71) Applicant: Koito Manufacturing Co., Ltd., Minato-ku (JP)

(72) Inventors: Takayuki Yagi, Shizuoka (JP); Satoshi Yamamura, Shizuoka (JP)

(73) Assignee: KOITO MANUFACTURING CO., LTD., Minato-Ku, Tokyo (JP)

(*) Notice: Subject to any disclaimer, the term of this patent is extended or adjusted under 35 U.S.C. 154(b) by 236 days.

(21) Appl. No.: 14/098,583

(22) Filed: Dec. 6, 2013

(65) Prior Publication Data

US 2014/0092618 A1   Apr. 3, 2014

Related U.S. Application Data

(63) Continuation of application No. PCT/JP2012/003142, filed on May 14, 2012.

(30) Foreign Application Priority Data

Jun. 8, 2011   (JP) .................................. 2011-128419

(51) Int. Cl.
  *F21S 8/10*   (2006.01)
  *G02B 26/10*   (2006.01)

(52) U.S. Cl.
  CPC ........ *F21S 48/1721* (2013.01); *F21S 48/1154* (2013.01); *F21S 48/1225* (2013.01); *F21S 48/1747* (2013.01); *G02B 26/10* (2013.01); *F21S 48/325* (2013.01)

(58) Field of Classification Search
  CPC ............................ F21S 48/1721; F21S 48/17
  USPC ........................................ 362/276, 509–549
  See application file for complete search history.

(56) References Cited

U.S. PATENT DOCUMENTS

| 8,770,807 B2* | 7/2014 | Holzinger ........... F21S 48/1721 315/82 |
| 2001/0019486 A1 | 9/2001 | Thominet |
| 2003/0174512 A1 | 9/2003 | Rohr |
| 2006/0002109 A1* | 1/2006 | Imade ................. H04N 9/3114 362/231 |

(Continued)

FOREIGN PATENT DOCUMENTS

| CN | 101559734 A | 10/2009 | |
| DE | 102005032128 A1 * | 1/2007 | ............... B60Q 1/02 |

(Continued)

OTHER PUBLICATIONS

Machine Translation: DE 10 2005 032 128 A1.*
Machine Translation: JP 3508927 B2.*
Machine Translation: FR 2867835 A1.*

(Continued)

*Primary Examiner* — Evan Dzierzynski
*Assistant Examiner* — Christopher E Dunay
(74) *Attorney, Agent, or Firm* — Buchanan Ingersoll & Rooney PC

(57) ABSTRACT

An optical unit includes a lens through which light emitted from a light source enters from behind and the light emits frontward as an irradiation beam. A rotation lens moves periodically, and a front part is scanned with the irradiation beam, so that a predetermined irradiated region can be formed. The rotation lens may be configured such that the lens rotates about a rotation axis connected to a drive part and such that the direction of light, which emits from the light source and is then refracted when the light passes through the lens, varies periodically.

6 Claims, 9 Drawing Sheets

(56) References Cited

U.S. PATENT DOCUMENTS

| | | | | |
|---|---|---|---|---|
| 2007/0297175 | A1* | 12/2007 | Glent-Madsen | G02B 26/04 362/282 |
| 2009/0190323 | A1 | 7/2009 | Watanabe et al. | |
| 2010/0231869 | A1* | 9/2010 | Cheng | F21V 11/12 353/84 |
| 2013/0027442 | A1* | 1/2013 | Jorgensen | F21S 10/007 345/690 |
| 2013/0088692 | A1* | 4/2013 | Su | H04N 9/3114 353/84 |

FOREIGN PATENT DOCUMENTS

| | | | | |
|---|---|---|---|---|
| DE | 202007018181 U1 | 5/2008 | | |
| EP | 2202459 A1 | 6/2010 | | |
| FR | 2867835 A1 * | 9/2005 | | F21S 48/1721 |
| JP | 2001-266620 A | 9/2001 | | |
| JP | 3508927 B2 * | 3/2004 | | F21S 48/1275 |
| JP | 2009-224039 A | 10/2009 | | |
| JP | 2010-091905 A | 4/2010 | | |

OTHER PUBLICATIONS

Office Action (Notification of Reason(s) for Refusal) issued on Feb. 10, 2015, by the Japanese Patent Office in corresponding Japanese Patent Application No. 2011-128419, and an English Translation of the Office Action. (5 pages)

Office Action issued on Feb. 15, 2015, by the Chinese Patent Office in corresponding Chinese Patent Application No. 201280027421.2, and an English Translation of the Office Action. (13 pages).

International Preliminary Report on Patentability (Forms PCT/IB/373 and PCT/IB/237) dated Aug. 14, 2012, issued in corresponding International Application No. PCT/JP2012/003142. (4 pgs).

Translation of the International Preliminary Report on Patentability (Forms PCT/IB/373 and PCT/IB/237) dated Dec. 10, 2013, issued in corresponding International Application No. PCT/JP2012/003142 . (5 pgs).

International Search Report (Form PCT/ISA/210) dated Aug. 14, 2012, issued in corresponding International Application No. PCT/JP2012/003142 with translation thereof. (2 pgs).

Communication/Supplementary Search Report issued on Oct. 21, 2015, by the European Patent Office in corresponding European Patent Application No. 12797559.7 (5 pages).

* cited by examiner

OPTICAL UNIT

CROSS-REFERENCE TO RELATED APPLICATIONS

This application is based upon and claims the benefit of priority from the prior Japanese Patent Application No. 2011-128419, filed on Jun. 8, 2011, and International Patent Application No. PCT/JP 2012/003142, filed on May 14, 2012, the entire content of each of which is incorporated herein by reference.

BACKGROUND OF THE INVENTION

1. Field of the Invention

The present invention relates to an optical unit and, in particular, to an optical unit used for an automotive lamp.

2. Description of the Related Art

Known in recent years are automotive headlamps for irradiating an area in front of a vehicle with light emitted from a light source comprised of a plurality of light-emitting elements. For example, an automotive headlamp that forms a desirable light distribution pattern is proposed (see Patent Document 1). In this proposed automotive headlamp, a condensing lens is placed in a front part of the light source where a plurality of light-emitting elements are disposed in a matrix, and part of light emitted from the light source is shielded by a diaphragm placed between the light source and the condensing lens.

RELATED ART DOCUMENT

[Patent Document 1] Japanese Unexamined Patent Application Publication (Kokai) No. 2001-266620.

However, a great many light-emitting elements are required in order that a wide range of area in front of the vehicle can be irradiated with light. Accordingly, the cost of apparatus increases and the apparatus gets larger in size, thereby much restricting its layout.

SUMMARY OF THE INVENTION

The present invention has been made in view of the foregoing circumstances, and a purpose thereof is to provide a technology regarding a new optical unit that scans using light of the light source.

Optional combinations of the aforementioned constituting elements, and implementations of the invention in the form of apparatuses, methods, systems, and so forth may also be effective as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
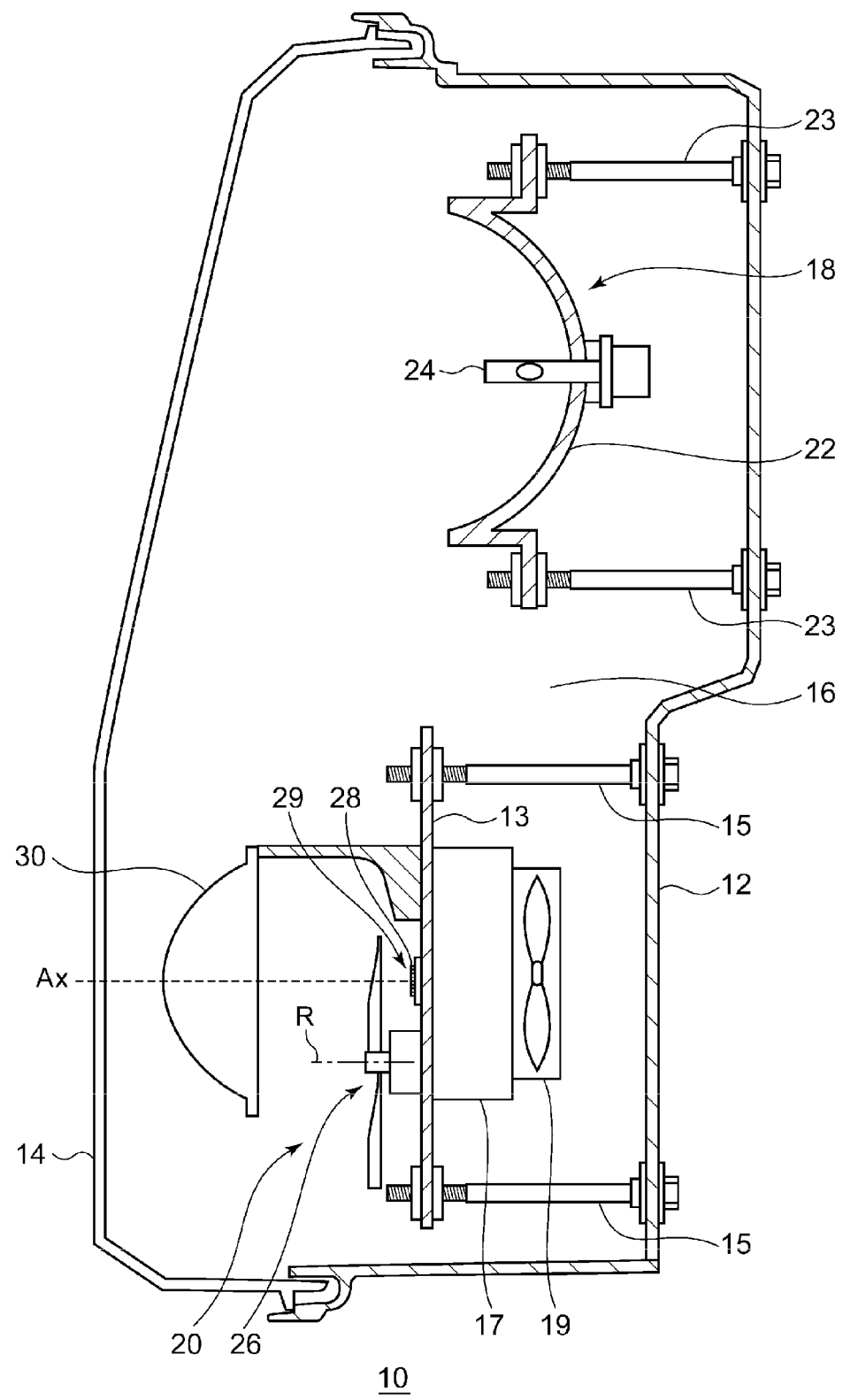
FIG. 1 is a horizontal cross-sectional view of an automotive headlamp according to a first embodiment.

In order to resolve the above-described problems, an optical unit according to one embodiment of the present invention includes: a lens through which light emitted from a light source enters from behind and the light emits frontward as an irradiation beam. The lens moves periodically and a front area of the lens is scanned with the irradiation beam so as to form a predetermined irradiated region.

By employing this embodiment, the predetermined irradiated region can be formed by scanning frontward with the irradiation beam by moving the lens periodically. Thus, the light source can be made smaller than in the case where a predetermined irradiated region is formed with light emitted, as it is, from the light source.

The lens is configured such that the lens rotates about a rotation axis connected to a drive part and such that a direction of light, which has emitted from the light source and is refracted when the light passes through the lens, varies periodically. Thus, the scanning using light of the light source can be achieved by a simple configuration.

The optical unit may further include a light source. The light source may be configured such that luminous intensity is varied in a partial phase range of a cycle of a lens movement. This can vary the brightness of a part of the predetermined irradiated region.

The optical unit may further include a light source having a plurality of light-emitting elements. The plurality of light-emitting elements may include a plurality of types of light-emitting elements having different emission colors. Thereby, a front area can be scanned with light having colors that cannot be otherwise achieved with a single-color light emitting element only.

The plurality of light-emitting elements may include a red light-emitting element, a green light-emitting element, and a blue light-emitting element. Thereby, the front area can be scanned with white light.

Hereinafter, the present invention will be described based on preferred embodiments with reference to the accompanying drawings. The same or equivalent constituents, members, or processes illustrated in each drawing will be denoted with the same reference numerals, and the repeated description thereof will be omitted as appropriate. The preferred embodiments do not intend to limit the scope of the invention but exemplify the invention. All of the features and the combinations thereof described in the embodiments are not necessarily essential to the invention.

An optical unit to the embodiments of the present invention can be used for various types of automotive lamps. A description is given hereinbelow of a case when the optical unit according to the embodiments of the present invention is applied to an automotive headlamp among automotive lamps.

First Embodiment

Figure 2:
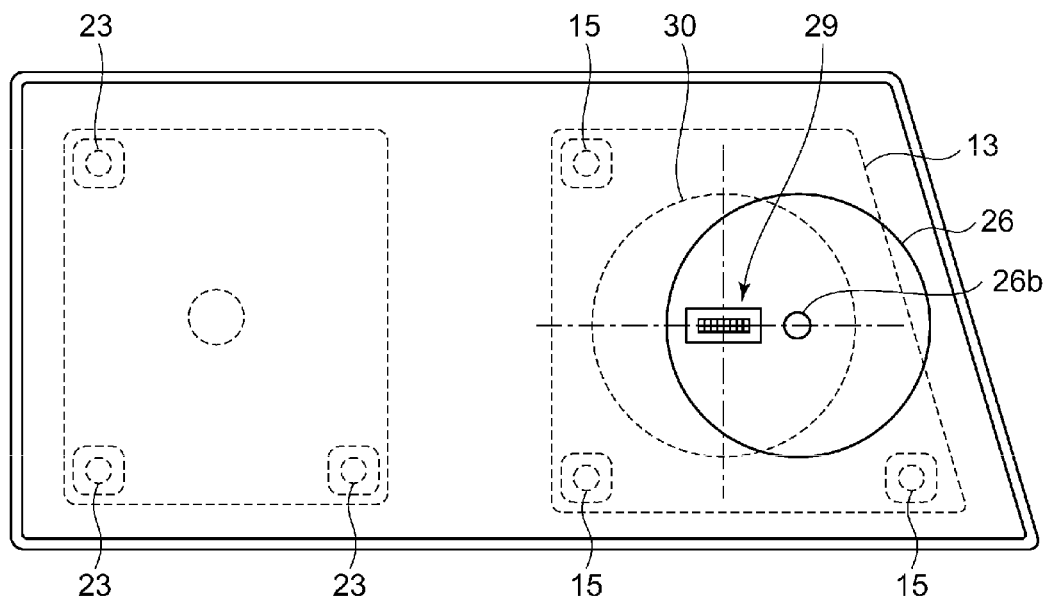
FIG. 2 is a front view showing essential parts of the automotive headlamp shown in FIG. 1.

FIG. 1 is a horizontal cross-sectional view of an automotive headlamp according to a first embodiment. FIG. 2 is a front view showing essential parts of the automotive headlamp shown in FIG. 1. An automotive headlamp 10 is a right-side headlamp mounted on a right side of a front end part of a vehicle, and a left-side headlamp mounted on a left side thereof is identical to the right-side headlamp except the internal structures of the right-side and left side headlamps are bilaterally symmetrical to each other. Thus the right-side automotive headlamp 10 is hereinbelow described in detail, and a description of the left-side automotive headlamp is omitted.

As shown in FIG. 1, the automotive headlamp 10 includes a lamp body 12 having a recess opened frontward. The frontward opening of the lamp body 12 is covered with a front transparent cover 14 so as to form a lamp chamber 16. The lamp chamber 16 functions as a space, where two lamp units 18 and 20 are housed, with the two lamp units disposed side by side in a vehicle width direction.

Of these lamp units, the lamp unit 20 is one located more inwardly than the lamp unit 18 and is disposed on the lower side of the right-side automotive headlamp 10 in FIG. 1. This lamp unit 20, provided with a lens, is configured such that a light distribution variable high beam can be irradiated. On the other hand, the lamp unit 18 is one located more outwardly than the lamp unit 20 and disposed on the upper side of the right-side automotive headlamp 10 of FIG. 1. This lamp unit 18 is configured such that a high beam can be irradiated.

The lamp unit 18 for low beam has a reflector 22, a light source bulb (incandescent bulb) 24 supported by the reflector 22, and a not-shown shade. The reflector 22 is supported relative to the lamp body 12 by a means that uses an aiming screw 23 and a nut, for instance, in a freely tiltable manner.

As shown in FIG. 1, the lamp unit 20 includes a rotation lens 26, a light source 29 having a plurality of LEDs 28, and a convex lens 30, disposed in a front part of the rotation lens 26, which functions as a projection lens. It is to be noted that a semiconductor light-emitting element, such as an EL element or LD element, can be used as the light source, instead of the LED 28. The light source by which the turning on and off of a lamp is accurately done in a short time is preferably used to particularly control the shading of a part of the light distribution pattern described later. Although the shape of the convex lens 30 may be selected, as appropriate, depending on the light distribution characteristics such as a required light distribution pattern and illuminance distribution, an aspheric lens or a free-form-surface lens is used. In the present embodiment, an aspheric lens is used as the convex lens 30.

The light source 29 is supported by a supporting plate 13. The supporting plate 13 is secured to the lamp body 12 by aiming screws 15 at three corners of the supporting plate 13. A heat radiation fan 19 is mounted to a surface of the supporting plate 13 opposite to a surface thereof on which the light source 29 of the supporting plate 13 is provided, with a heat radiation fin 17 disposed between the supporting plate 13 and the heat radiation fan 19. With this arrangement as described above, the light source 29 is cooled by the heat radiation fan 19 via the supporting plate 13 and the heat radiation fin 17, so that a rise in temperature is inhibited.

The rotation lens 26 is rotated about a rotation axis R in one direction by a not-shown driving source such as a motor. Also, the rotation lens 26, while it is being rotated, refracts the light emitted from the LEDs 28. And the rotation lens 26 has an incident surface and an emission surface structured so that a desired light distribution pattern can be formed.

Figure 3:
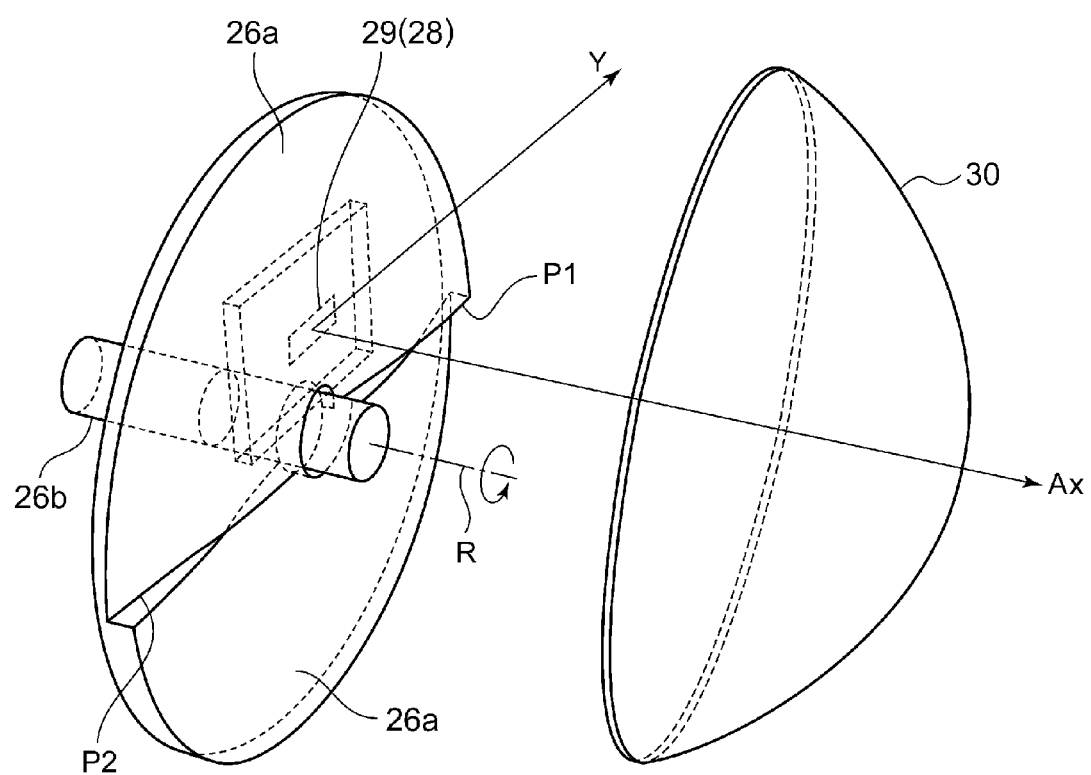
FIG. 3 is a perspective view schematically showing a structure of a lamp unit including an optical unit according to a first embodiment.

FIG. 3 is a perspective view schematically showing a structure of the lamp unit 20 including the optical unit according to the present embodiment.

The rotation lens 26 is a transparent disk-shape member through which light emitted from the light source transmits and which also functions as a refracting surface. The rotation lens 26 shown in FIG. 3 is configured such that two fan-shaped blades 26a having the same forms are provided around a cylindrical rotating part 26b. The rotation axis R of the rotation lens 26 is parallel with an optical axis Ax, and is provided in a plane including the optical axis Ax and the LEDs 28. In other words, the rotation axis R is provided approximately parallel with a scanning plane of light (irradiation beams) of the LEDs 28 that scans in the longitudinal direction by rotation. This helps reduce the thickness of the optical unit. Here, the scanning plane may be thought of as a fan-shaped plane that is formed by continuously concatenating the tracks of light, emitted from the LEDs 28, which is the scanning light, for instance.

Also, the blade 26a of the rotation lens 26 is structured such that the thickness of the blade 26a gradually decreases or increases toward a peripheral direction with the rotation axis R as the center. In other words, the blade 26a is structured such that the cross sectional shape thereof in a plane containing the rotation axis R gradually changes. This enables the scanning using the light emitted from the LEDs 28. This will be described later in detail.

Figure 4A:
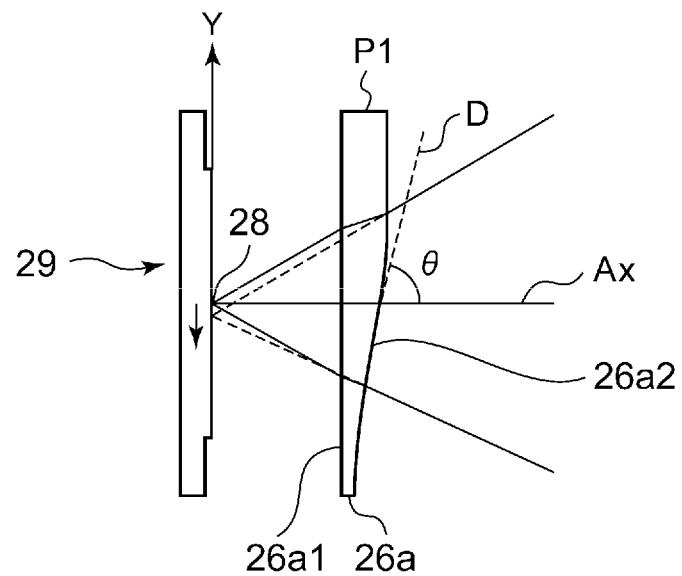
FIGS. 4A and 4B are cross sectional views showing how a blade behaves according to a rotation angle of a rotation lens in a lamp unit of a first embodiment.
Figure 4B:
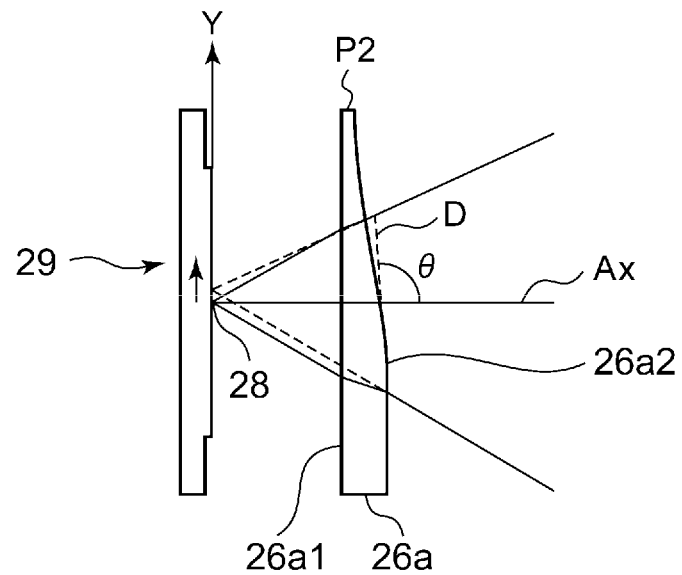

FIGS. 4A and 4B are cross sectional views showing how the blade behaves according to a rotation angle of the rotation lens 26 in the lamp unit of the present embodiment. FIG. 4A shows how light is refracted when a position P1 of the blade 26a shown in FIG. 3 is the front of the light source. FIG. 4B shows how light is refracted when a position P2 of the blade 26a shown in FIG. 3 is the front of the light source. An arrow Y in each of FIGS. 4A and 4B indicates the width direction of a vehicle.

An incident surface 26a1 of the blade 26a is constructed to be almost flat. On the other hand, an emission surface 26a2 of the blade 26a has an oblique or curved surface toward the rotating part from an peripheral part. To describe in more detail, the blade 26a has a twisted shape such that as the position of the blade 26a, in the peripheral direction with the rotation axis R as the center, changes, an angle θ, which is formed between a radial direction D of the emission surface 26a2 and the optical axis Ax, changes. This enables the scanning using the light emitted from the light source 29. This will be described later in detail.

Figure 5:
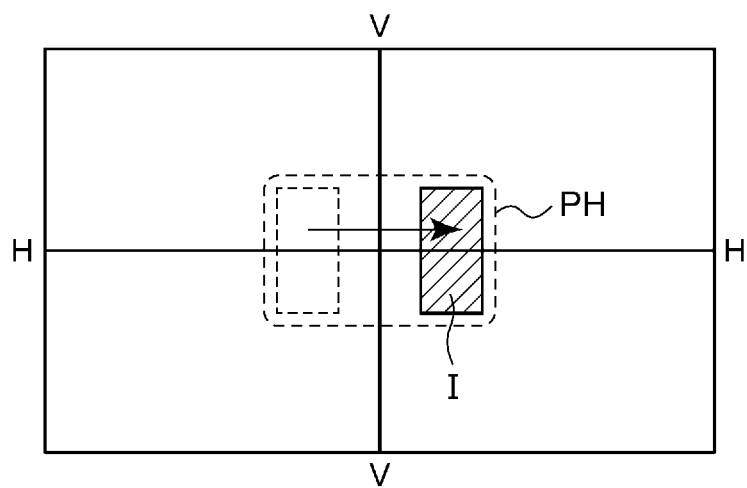
FIG. 5 schematically shows projection images when the blade is in positions shown in FIGS. 4A and 4B.

FIG. 5 schematically shows projection images when the blade is in positions shown in FIGS. 4A and 4B. The light emitted from the LED 28 lying on the optical axis Ax is refracted by the incident surface 26a1 and the emission surface 26a2 and is then emitted frontward as an irradiation beam. If the phase of the blade 26a is in a position shown in FIG. 4A, the position of a virtual image of the LED 28 will be in a position shifted below from the optical axis Ax of FIG. 4A. If, on the other hand, the phase of the blade 26a is in a position shown in FIG. 4B, the position of a virtual image of the LED 28 will be in a position shifted above from the optical axis Ax of FIG. 4B.

Thus, the position of the virtual image of the LED 28 moves with the rotation of the blade 26a. In other words, the LED 28 seemingly moves in a vehicle width direction Y. As a result, a projection image I formed by the irradiation beam moves in the vehicle width direction Y, too. In this manner, scanning frontward by the irradiation beam forms a high-beam light distribution pattern PH.

Although the two blades 26a of the rotation lens 26 according to the present embodiment are of identical shape to each other, the emission surface is discontinuous at their boundaries. That is, immediately after part of one blade 26a at the position P1 has passed the front of the LED 28 as a result of rotation of the rotation lens 26, part of the other blade 26a at the position P2 passes the front of the LED 28. Thus, where the rotation lens 26 is rotating in one direction, the scanning with the aforementioned irradiation beam will be done in one direction as well.

The rotation lens 26 according to the present embodiment is configured such that the rotation of the rotation lens 26 by 180 degrees can scan a front area with the light emitted from the LED 28 one time in one direction (horizontally). In other words, when one piece of blade 26a passes the front of the LED 28, a desired area in front of the vehicle is scanned one time with the light of LED 28. The number of and the shape of blades 26a and the rotational speed of the rotation lens 26 are set, as appropriate, based on the results of experiments and simulation runs in consideration of the required characteristics of light distribution patterns and the flickering of an image to be scanned. A motor is preferable as a drive part capable of varying the rotational speed according to various light distribution controls. This can easily change the scanning timing. Such a motor as this is preferably one that can obtain the rotation timing information from the motor itself. More specifically, such a motor may be a DC brushless motor, for instance. If the DC brushless motor is used, the rotation timing information will be obtained and therefore a device such as an encoder can be omitted.

As described above, in the rotation lens 26 according to the present embodiment, the shape and the rotational speed of the blades 26a are devised, so that an area in front of the vehicle can be scanned with the light of the LEDs 28 in the longitudinal direction.

Figure 6A:
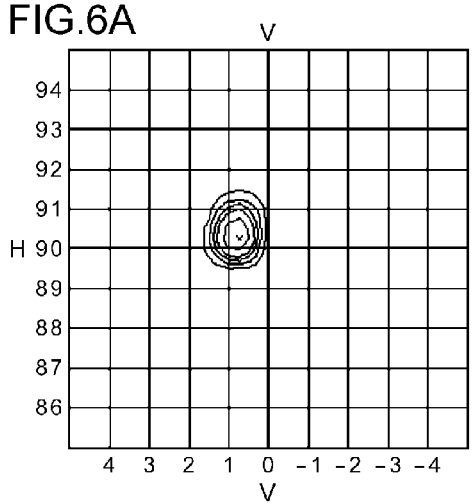
FIGS. 6A to 6E each shows a projection image at each position having a different rotation angle of a rotation lens.
Figure 6D:
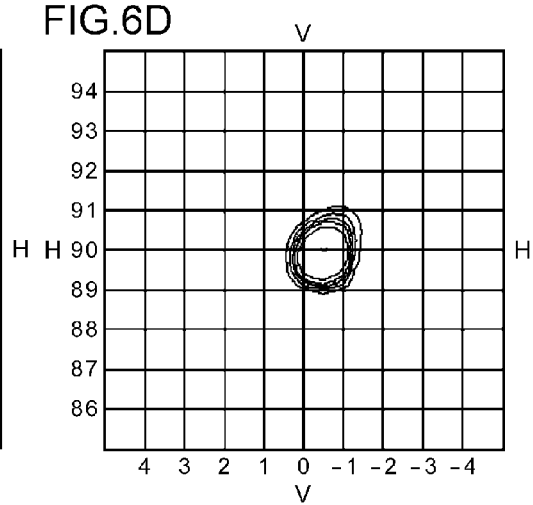
Figure 6B:
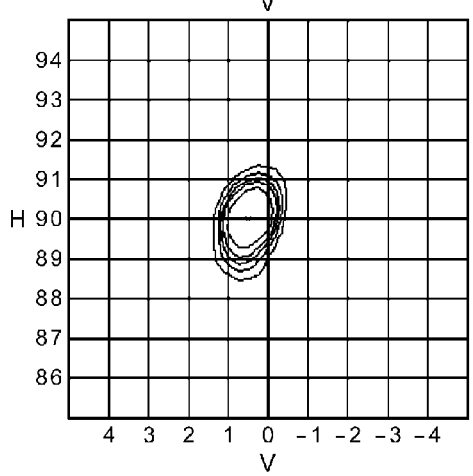
Figure 6E:
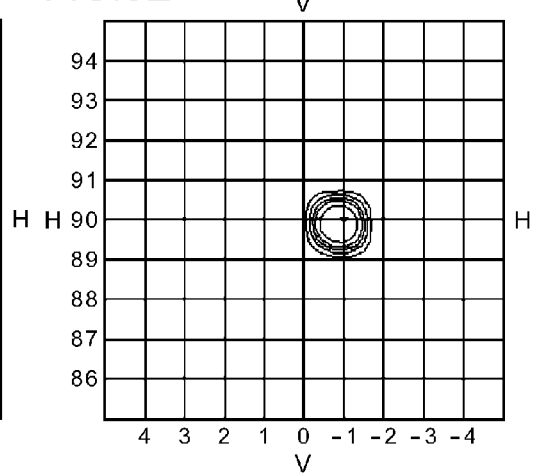
Figure 6C:
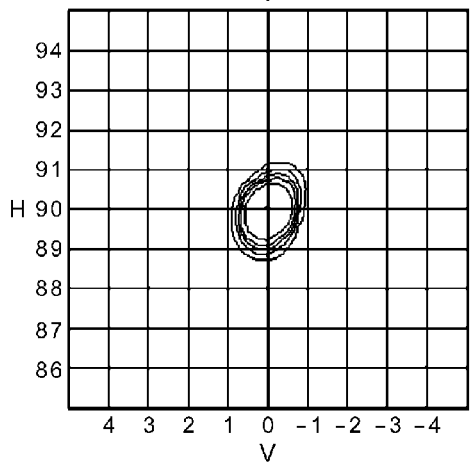
Figure 6F:
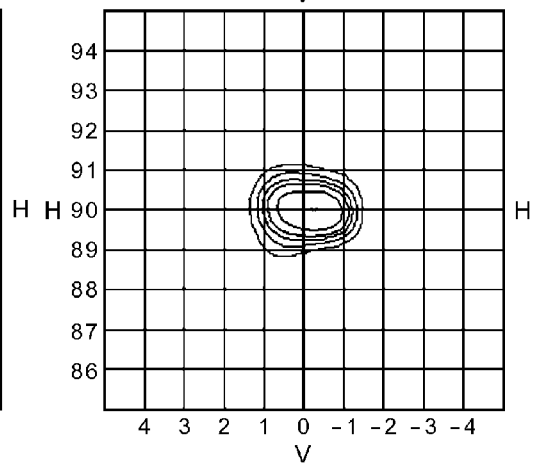
FIG. 6F shows a high-beam light distribution pattern formed by combining each projection image.

FIGS. 6A to 6E each shows a projection image at each position having a different rotation angle of the rotation lens, and FIG. 6F shows a high-beam light distribution pattern formed by combining each projection image. FIG. 6A shows a projection image when the rotation angle of the rotation lens is 0 degree. FIG. 6B shows a projection image when the rotation angle of the rotation lens is 45 degree. FIG. 6C shows a projection image when the rotation angle of the rotation lens is 90 degree. FIG. 6D shows a projection image when the rotation angle of the rotation lens is 135 degree. FIG. 6E shows a projection image when the rotation angle of the rotation lens is 180 degree. FIG. 6F shows a high-beam light distribution pattern formed by scanning with the irradiation beam. The unit of the vertical axis and the horizontal axis is degree (°) and indicates a range of illumination and an illumination position. As shown in FIGS. 6A to 6E, rotation of the rotation lens 26 moves the projection image in a horizontal direction, As shown in FIG. 6F, in the automotive headlamp 10 according to the present embodiment, the light of the LED 28 is refracted by the rotation lens 26 and then a front area is scanned with the refracted light. As a result, a high-beam light distribution pattern of a substantially rectangle can be formed. As described above, a desirable light distribution pattern can be formed by rotation of the rotation lens 26 in one direction. Thus, a driving power supplied by a special mechanism such as a resonant mirror is no longer required.

Also, limitation to the size of a reflection surface as in the resonant mirror is minimal. Also, the diameter of the rotation lens 26 according to the present embodiment is almost identical to the diameter of the convex lens 30, so that the area of the blade 26a can be increased in proportion to the diameter thereof.

Also, in the automotive headlamp 10 equipped with the optical unit according to the present embodiment, the timing, with which the LED 28 is turned on and off, and the change in the luminous intensity of the LED 28 are synchronized with the rotation of the rotation lens 26. Thus, a high-beam light distribution pattern where an arbitrary region is shaded can be formed. If the luminous intensity of the LEDs 28 is varied (namely, if the LEDs 28 are turned on and off), by synchronizing the luminous intensity thereof with the rotation of the rotation lens 26, a control can be performed where the light distribution pattern itself can swivel by shifting the phase of the luminous intensity, for instance.

As described above, in the automotive headlamp according to the present embodiment, the light distribution pattern can be formed by scanning the light of LED, and a shading region can be arbitrarily formed in part of the light distribution pattern by controlling the change in the luminous intensity. Hence, an intended area can be accurately shaded by using as small a number of LEDs as possible, as compared with a case where a part of the plurality of LEDs is/are turned on and off. Also, a plurality of shading regions can be formed in the automotive headlamp 10. Thus, even though a plurality of vehicles are present in front of his/her own vehicle, the regions corresponding respectively to the plurality of vehicles can be shaded.

Also, in the automotive headlamp 10, the shading can be controlled without moving a basic light distribution pattern, so that less of an uncomfortable feeling can be caused in a driver when the shading is controlled. Also, the light distribution pattern can swivel without moving the lamp unit 20, so that the mechanism of the lamp unit 20 can be simplified. Thus, it is only necessary that the automotive headlamp 10 has a motor required for the rotation of the rotation lens 26 as a drive part used to variably control the light distribution. Hence, the structure can be simplified, the cost can be reduced, and the size of the automotive headlamp 10 can be reduced.

(Structure of Light Source)

The above-described light source 29 is comprised of a plurality of LEDs 28. However, a single LED 28 may constitute the light source 29 as long as a desirable illumination performance is met. Also, the light source may be white LED where a light-emitting element and a phosphor are combined together. Also, the light source may have a plurality of types of light-emitting elements having different emission colors. Thus, the front part can be scanned with light having colors that cannot be otherwise achieved with a single-color light-emitting element only. Also, the light source may include red light-emitting elements (R elements), green light-emitting elements (G elements), and blue light-emitting elements (B elements) as the plurality of light-emitting lights. Thereby, the front part can be scanned with while light. Also, white light can be achieved without using the phosphor, so that the light emitted from the light source can be efficiently used for the illumination. To achieve the white light, a blue light-emitting element and a yellow light-emitting element may be combined, or a cyan light-emitting element and a magenta light-emitting element may be combined.

Figure 7:
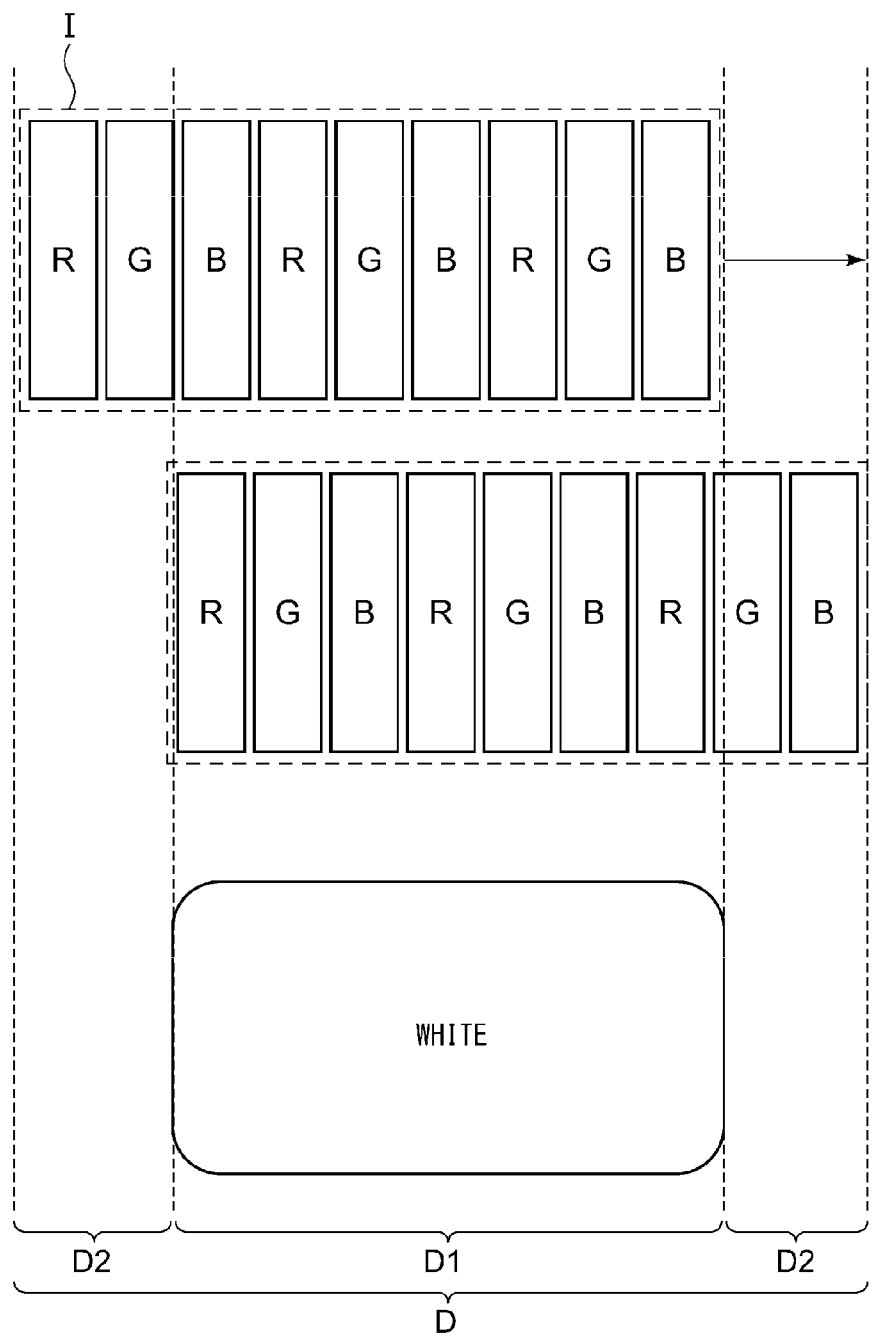
FIG. 7 schematically shows how a front area is scanned with a light source having a plurality of types of light-emitting elements.

FIG. 7 schematically shows how a front area is scanned with the light source having a plurality of types of light-emitting elements. As shown in a top part of FIG. 7, if the light source 29 includes a plurality of combinations of R elements, G elements and B elements in a line, the projection image I with the rotation angle of the rotation lens at 0 degree will be positioned at a left part of an irradiated region D. This projection image is constituted by different colors of red, green and blue in this order. If, however, such a projection image as this moves to a right side of FIG. 7, at least a central part D1 of the irradiated region D will be irradiated with white light.

Where the light source 29 includes R elements, G elements and B elements arranged in a line (arranged in an array), the white light can be achieved if, as shown in FIG. 7, the shape of the rotation lens 26 is set such that the projection image I is moved by two elements as a result of rotation of the rotation lens 26. With such a negligible movement like this, the refracting angle of light at the incident surface and the emission surface of the rotation lens may be small. Accordingly, the thickness of the rotation lens can be made thinner and the manufacturing and processing thereof can become easier. Where the light source 29 includes a plurality of types of light-emitting elements, both end parts D2 of the irradiated region D are irradiated with light having colors different from those of the central part D1. In this manner, the color of light with which the irradiated region D is irradiated can be partially varied if the light source 29 is comprised of a plurality of types of light-emitting elements disposed in a line.

The functions of the above-described optical unit in the automotive headlamp 10 according to the present embodiment are summarized as follows.

An optical unit according to the present embodiment includes the rotation lens 26 through which light emitted from the light source 29 enters from behind and the light emits frontward as an irradiation beam. The rotation lens 26 scans a front area with the irradiation beam as a result of rotation operation of the rotation lens 26, and thereby the rotation lens 26 is configured such a manner as to form a predetermined irradiated region. Thus, the rotation lens 26 moves periodically and a front area is scanned with the irradiation beam, so that the predetermined irradiated region can be formed. Hence, the light source can be made smaller than in the case where a predetermined irradiated region is formed with light emitted directly from the light source.

Also, the rotation lens 26 is configured such that the rotation lens 26 rotates about the rotation axis R connected to the drive part, such as the motor, and such that the direction of light, which has emitted from the light source 29 and is refracted when the light passes through the lens, varies periodically. Thus, the scanning using light of the light source 29 can be achieved by a simple configuration.

Also, the light source 29 may be configured such that luminous intensity is varied in a partial phase range of a cycle of the movement of the rotation lens 26. This can vary the brightness of a part of the predetermined irradiated region. In particular, the light source is turned on and off in the partial phase range, so that a light distribution pattern where a part of the irradiated region is shaded can be formed.

Also, the optical unit is configured such that the rotation lens 26 is combined with the light source 29 having a wide area (width) where a plurality of light-emitting elements are arranged in a line (arranged in a matrix). Thus, a slight scanning of irradiation beam allows the predetermined irradiated region to be irradiated with the irradiation beam.

Also, since the rotation axis R of the rotation lens 26 is parallel with the optical axis Ax, the rotation lens 26 of the left-side lamp unit 20 and the right-side lamp unit 20 can be placed the same way.

If light emitted from the light source 29 where a plurality of LED chips are arranged is directly emitted frontward as the irradiation beam, the spacing between chips will be formed as dark regions on the projection image. This causes a partial unevenness of brightness in the irradiated region. However, the optical unit according to the present embodiment can scan the front area with the irradiation beam of the rotation lens 26 and therefore the unevenness of brightness is reduced.

Second Embodiment

Figure 8:
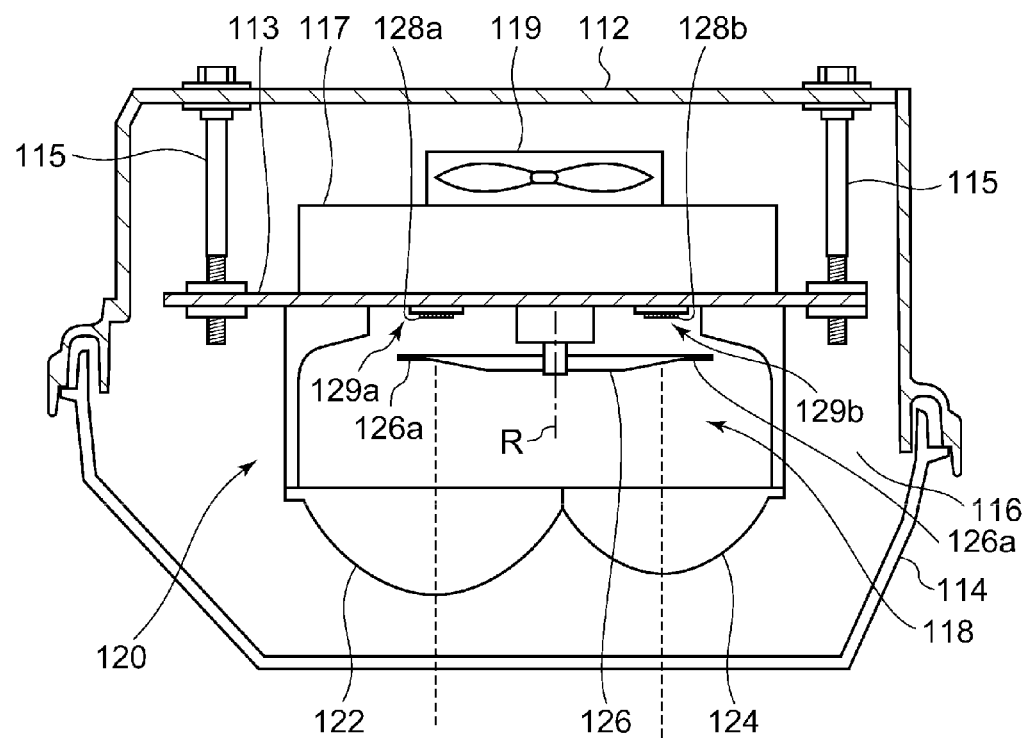
FIG. 8 is a horizontal cross-sectional view of an automotive headlamp according to a second embodiment.
Figure 9:
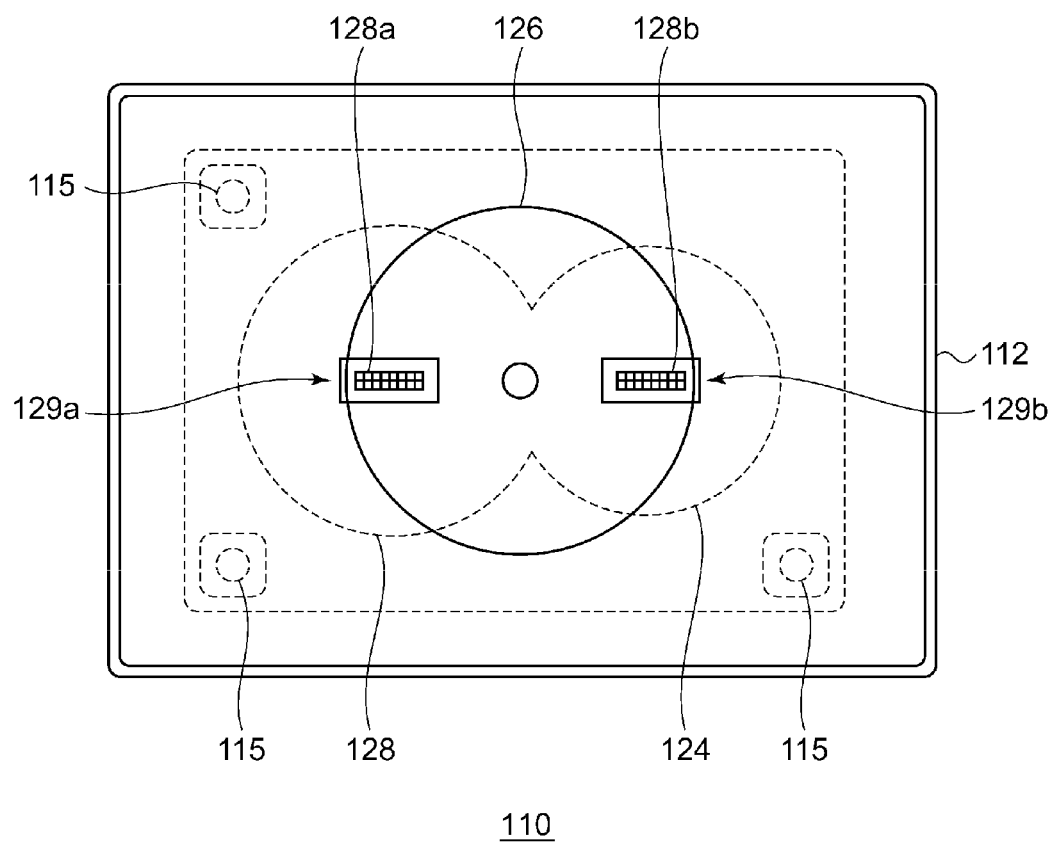
FIG. 9 is a front view showing essential parts of the automotive headlamp shown in FIG. 8.

FIG. 8 is a horizontal cross-sectional view of an automotive headlamp according to a second embodiment. FIG. 9 is a front view showing essential parts of the automotive headlamp shown in FIG. 8.

As shown in FIG. 8, an automotive headlamp 110 includes a lamp body 112 having a recess opened frontward. The frontward opening of the lamp body 112 is covered with a front transparent cover 114 so as to form a lamp chamber 116. The lamp chamber 116 functions as a space, where a lamp unit 120 including two light sources 129a and 129b is housed.

As shown in FIG. 8, the lamp unit 120 includes a rotation lens 126, a light source 129a having a plurality of LEDs 128a, a light source 129b having a plurality of LEDs 128b, and convex lenses 122 and 124, disposed in a front part of the rotation lens 126, which function as projection lenses. This lamp unit 120 is configured such that a light distribution variable high beam can be irradiated. Although the shape of the convex lenses 122 and 124 may be selected, as appropriate, depending on the light distribution characteristics such as a required light distribution pattern and illuminance distribution, an aspheric lens or a free-form-surface lens is used.

The light sources 129a and 129b are supported by a supporting plate 113. The supporting plate 113 is secured to the lamp body 112 by aiming screws 115 at three corners of the supporting plate 113. A heat radiation fan 119 is mounted to a surface of the supporting plate 113 opposite to a surface thereof on which the light sources 129a and 129b of the supporting plate 113 are provided, with a heat radiation fin 117 disposed between the supporting plate 113 and the heat radiation fan 119. With this arrangement as described above, the light sources 129a and 129b are cooled by the heat radiation fan 119 via the supporting plate 113 and the heat radiation fin 117, so that the rise in temperature is inhibited.

The rotation lens 126 is rotated about a rotation axis R in one direction by a not-shown driving source such as a motor. Also, the rotation lens 126, while it is being rotated, refracts the light emitted from the LEDs 128a and 128b. And the rotation lens 126 has an incident surface and an emission surface structured so that a desired light distribution pattern can be formed. Since the refraction of light by the rotation lens 126 is similar to the operation of the rotation lens 26 of the first embodiment, the description thereof is omitted here.

The optical unit 118 according to the present embodiment includes the rotation lens 126 and a plurality (e.g., two in the second embodiment) of light sources 129a and 129b each having LEDs as light-emitting elements. A plurality of LEDs 128a in one of the plurality of light sources 129a are light collecting LEDs and are arranged so that a strong light condensing, toward the front of the traveling direction, suitable for the high-beam light distribution pattern can be achieved. A plurality of LEDs 128*b* in the other thereof are diffusion LEDs and are arranged so that diffusion light with which to irradiate a wide range of regions suitable for the high-beam light distribution pattern can be achieved. Note that a plurality of LEDs are not necessary provided in each light source and a single LED may suffice if sufficient brightness can be achieved. Also, all of LEDs are not necessarily turned on and off and, instead, only some of LEDs may light up depending on the running circumstances of vehicles and the conditions in front of his/her own vehicle.

The light source 129*a* and the light source 129*b* are arranged so that lights emitted from the light source 129*a* and the light source 129*b*, respectively, are refracted at different positions by each blade 126*a* of the rotation lens 126. In this manner, a plurality of light sources 129*a* and 129*b* are placed so that the lights emitted therefrom are refracted at different positions of the blade 126*a* of the rotation lens 126, and thereby a plurality of light distribution patterns can be formed. At the same, a new light distribution pattern can be formed by combining those light distribution patterns. This makes it easy to design an ideal light distribution pattern.

The present invention has been described by referring to each of the above-described embodiments. However, the present invention is not limited to the above-described embodiments only, and those resulting from any appropriate combination or substitution of components in the embodiments are also effective as embodiments. Also, it is understood by those skilled in the art that modifications such as changes in the order of combination or processings made as appropriate in each embodiment or various changes in design may be added to the embodiments based on their knowledge and that the embodiments added with such modifications are also within the scope of the present invention.

For example, in the automotive headlamp, the rotation lens may be stopped at an arbitrary angle without rotating the rotation lens, so that a spot light whose maximum luminous intensity is extremely high can be formed at a desired position. Thereby, irradiating a specific obstacle (including a person) with the bright spot light can give an early warning.

Also, the aspheric lens used in the above-described embodiments is not necessarily one that corrects a distorted image but may be one that does not the correct the distorted image.

Although, in each of the above-described embodiments, the description has been given of the case where the optical unit is applied to the automotive headlamp, the optical unit according to the embodiments may be applied to other fields of technology. For example, it may be applied to lighting equipment used in stages or amusement facilities where various kinds of light distribution patterns are switched. In the conventional practice, the lighting equipment used in such a field requires a large-scale drive mechanism. In contrast, the optical unit according to the present embodiments allows various light distribution patterns to be formed through the rotation of the rotation lens and by turning on and off the light source. Thus the large-scale drive mechanism is no longer necessary and therefore the size of equipment can be reduced.

In the optical unit according to each of the above-described embodiments, the light source is installed in the position where the direction in which the front area is scanned with the irradiation beam is the vehicle width direction relative to the rotation lens. However, the light source may be installed in a position where the direction in which the front area is scanned with the irradiation beam is a vehicle vertical direction relative to the rotation lens, instead. In such a case, the front area can be scanned vertically with the light emitted from the light source.

What is claimed is:

1. An optical unit including:
   a lens through which light emitted from a light source enters from behind and the light emits frontward as an irradiation beam; and
   a light source,
   wherein the lens moves periodically and a front area of the lens is scanned with the irradiation beam so as to form a predetermined irradiated region,
   wherein the light source is configured such that luminous intensity is varied in a partial phase range of a cycle of a lens movement, and
   wherein the lens is configured such that the lens rotates about a rotation axis connected to a drive part and such that a direction of light, which has emitted from the light source and is refracted when the light passes through the lens, varies periodically.

2. An optical unit according to claim 1, wherein the light source has a plurality of light-emitting elements, and
   the plurality of light-emitting elements include a plurality of types of light-emitting elements having different emission colors.

3. An optical unit according to claim 2, wherein the plurality of light-emitting elements include a red light-emitting element, a green light-emitting element, and a blue light-emitting element.

4. An optical unit including:
   a lens configured to move periodically; and
   a light source configured to emit light from an area behind the lens such that the emitted light is refracted by the lens while passing from a back to a front of the lens,
   wherein the lens is configured such that, when the light source emits the light and the lens moves periodically, an area in front of the lens is scanned with an irradiation beam emitted from the lens so as to form a predetermined irradiated region, and
   wherein the light source is configured such that luminous intensity is varied in a partial phase range of a cycle of a lens movement.

5. An optical unit according to claim 4, wherein the light source has a plurality of light-emitting elements, and
   the plurality of light-emitting elements include a plurality of types of light-emitting elements having different emission colors.

6. An optical unit according to claim 5, wherein the plurality of light-emitting elements include a red light-emitting element, a green light-emitting element, and a blue light-emitting element.

* * * * *